A. E. COONEY.
ELEVATING TRUCK.
APPLICATION FILED JULY 3, 1920.
1,403,486.
Patented Jan. 17, 1922.
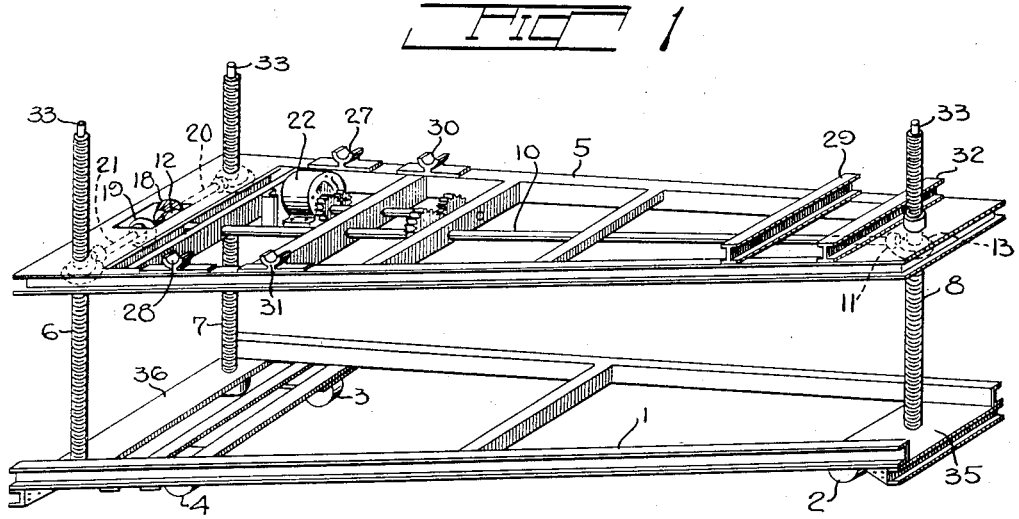
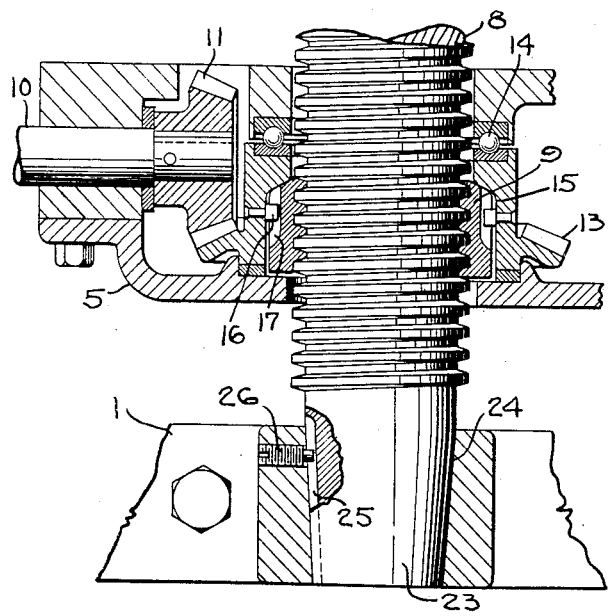
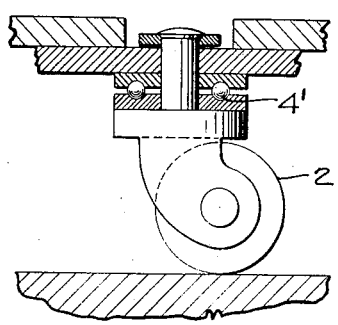
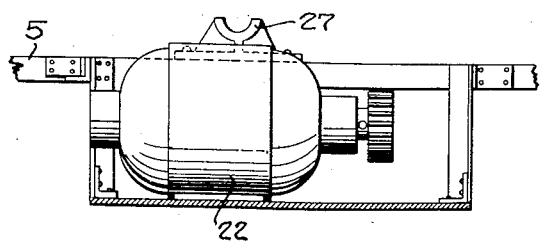
INVENTOR
Albert E. Cooney
BY
ATTORNEY

UNITED STATES PATENT OFFICE.

ALBERT E. COONEY, OF DETROIT, MICHIGAN, ASSIGNOR TO DODGE BROTHERS, A CORPORATION OF MICHIGAN.

ELEVATING TRUCK.

1,403,486. Specification of Letters Patent. Patented Jan. 17, 1922.

Application filed July 3, 1920. Serial No. 393,802.

*To all whom it may concern:*

Be it known that I, ALBERT E. COONEY, a citizen of the United States, residing at Detroit, Michigan, have invented certain new and useful Improvements in Elevating Trucks, of which the following is a clear, full, and exact description.

My invention relates to an elevating truck, and my object is to improve and simplify the construction. One object of my invention, attained by the preferred embodiment illustrated in the drawings, is to provide a truck which may be inserted under an automobile of standard construction, and which may then be elevated in order to raise the car to such a height as may be desired in stacking automobiles in a freight car for transportation.

I am aware that my invention may be embodied in various forms, and in the accompanying drawing of the specification I have illustrated one form which I now prefer.

In the drawings,

Fig. 1 represents a perspective view with the platform somewhat raised; and

Figs. 2, 3 and 4, details of construction.

The truck proper consists of a lower frame 1, provided with swiveling wheels 2, 3 and 4, one of which is shown in detail in Fig. 3 mounted on ball bearings 4', and an elevating platform 5. 6, 7 and 8 are standards mounted in the lower frame and extending upward through the platform to several times the height of the truck when the platform is lowered and preferably to a height above that of the automobile to be elevated. These standards, or portions on which the platform is mounted, may be and preferably are long screws. One of them is so shown in Fig. 2, which is typical of them all.

In order to cause the platform to travel up the screws or standards, I have in the present embodiment provided the platform at each of the screws with a nut 9 and suitable driving mechanism for rotating the nut. The driving mechanism may comprise a shaft provided with beveled pinions 11 and 12, the former meshing with a beveled gear 13 rotatable in the platform, the weight of the platform resting on ball bearings 14. The beveled gear 13 is chambered out, as indicated at 15, and rests upon the nut 9. A loose connection is provided between the beveled gear and the nut in order to allow for any slight displacement of the nut axis relatively to the beveled gear, so as to prevent the two from binding when any such displacement occurs. This may be, and preferably is, accomplished by a pin 16 on the beveled gear located in a vertical slot 17 in the nut.

The pinion 12 drives two pinions 18 and 19 connected to short shafts 20 and 21, which have at their ends pinions similar to pinion 11 for driving the nuts of the screws 6 and 7, similar to that illustrated in Fig. 2. Any suitable source of power may be provided, such as an electric motor 22.

In order to leave one end of the truck substantially unobstructed above the platform when it is in lowered position, I have made the projecting portions of the standard or standards at that end readily displaceable from the upright position when the platform is lowered. If desired this may be accomplished by making the entire standard, such as the standard 8, removable as a whole from the platform. This may be accomplished by providing the lower end of the screw 8 with a tapered portion 23 fitting into a tapered socket 24 in the lower frame. 25 is a vertical slot in the foot of the screw which may be engaged by a projection from a set screw 26 in the frame in order to hold the screw 8 from rotation. Each of the other standards 6 and 7 may be similarly mounted.

27, 28 are chocks for receiving the rear axles or other portion of the automobile, and 29 is a rest for the front axle or other portion of the car. Additional chocks 30 and 31 and an additional front support 32 may be provided, if desired, in order to accommodate cars of various wheel base.

In order to insert the truck under an automobile from the rear, the standard 8—and the other standards also, if desired—may be removed from the platform by driving the platform downward until it rests upon the lower frame, and continuing the movement of the driving mechanism. This will, of course, force the standards upward out of their respective sockets in the lower frame. With the standard 8 removed, the truck may be rolled under the car with the chocks 27, 28 underneath the rear axle, and the support 29 underneath the front axle, the removal of the standard 8 leaving the truck unobstructed for this purpose. The standard 8 may then be replaced, the driving mechanism started, and platform elevated, together with the car, to the required height for stacking or supporting it in a freight car at a height sufficient to enable another car to be inserted below it.

In order to prevent the platform from becoming disconnected from the standards, even though the nuts should run off the upper ends of the screw threads, we have provided projections 33 at the upper ends of the screws which are less in diameter than the threaded portions of the nuts. When the nuts reach these portions they will therefore rotate loosely thereon so that the platform will not become disconnected from the standards even if the motor and driving means continue to rotate.

I am aware that many changes may be made from the construction illustrated and described without departing from the scope of my invention as claimed. I, therefore, do not limit myself to the specific embodiment or the particular means to accomplish the results heretofore described.

What I claim is:

1. A truck having a lower wheeled frame and an elevatable platform, a standard at one end of the frame projecting upward above the platform and upon which one end of the platform is supported, and means to cause the platform to travel up said standard, said standard being readily displaceable from its position projecting above the platform when the same is lowered, to leave that end unobstructed.

2. A truck having a lower wheeled frame and an elevatable platform, a screw at one end of the frame projecting upward above the platform and upon which one end of the platform is supported, and means to cause the platform to travel up said screw, said screw being readily displaceable from its position projecting above the platform when the same is lowered, to leave that end unobstructed.

3. A truck having a lower wheeled frame and an elevatable platform, a standard at one end of the frame projecting upward above the platform and upon which one end of the platform is supported, and means carried by the platform to cause the platform to travel up said standard, said standard being readily displaceable from its position projecting above the platform when the same is lowered, to leave that end unobstructed.

4. A truck having a lower wheeled frame and an elevatable platform, screws carried by the frame and extending above the platform, nuts on the platform, and means for giving a relative rotation between the two whereby the platform travels up the screws, and means whereby the screw or screws at one end may be readily displaceable from the position projecting above the platform when the same is lowered.

5. A truck having a lower frame and an elevatable platform adapted when lowered to be inserted beneath an object, a plurality of standards, located toward the ends of the truck and extending above the platform when the platform is in lowered position, means arranged to cause the platform to travel up the standards, and means constructed and arranged to allow the standard or standards at one end of the truck to be displaced readily from the upright position projecting above the platform so as to leave that end unobstructed, whereby said truck when the platform is lowered may be inserted under an object and the displaced portion or portions replaced and the platform raised to elevate said object.

6. A truck having a frame and elevatable platform, means for elevating the latter comprising a screw extending above the platform, a nut carried by the platform and traveling on said screw, a rotatable portion surrounding said nut and carried by the platform and arranged to take the upward thrust of said nut when rotated, a flexible connection between said rotatable portion and said nut whereby slight displacement of the axis of said nut is permitted, and means for driving said rotatable portion and thereby said nut.

7. A truck having a lower wheeled frame and an elevatable platform, screws carried by the frame and extending above the platform, nuts on the platform and means for giving a simultaneous relative rotation between the two whereby the platform travels up the screws, and means whereby the screw or screws at one end may be removed to leave the platform unobstructed at that end, said removable screw being located in a socket in the frame whereby the screw may be positively removed from the socket by driving the platform in a downward direction against the frame.

8. A truck having a lower frame and an elevatable platform adapted when lowered to be inserted beneath an automobile, a plurality of standards, located at the end of the truck and extending above the platform several times the height of the truck when the platform is in lowered position, means carried by the platform constructed and arranged to cause the platform to travel up the standards, and means constructed and arranged to allow the standard or standards at one end of the truck to be removed readily from the platform to leave that end unobstructed, whereby the truck when lowered may be inserted under an automobile and the removed standard or standards reconnected and the platform raised to elevate the automobile.

9. A truck having a lower frame and elevatable platform adapted when lowered to be inserted beneath an object, a plurality of standards, located toward the ends of the truck and extending above the platform when the platform is in lowered position, means arranged to cause the platform to travel up the standards, means constructed and arranged to allow the standard or standards at one end of the truck to be displaced readily from the upright position projecting above the platform so as to leave that end unobstructed, whereby said truck when the platform is lowered may be inserted under an object and the displaced portion or portions replaced and the platform raised to elevate said object, and means constructed and arranged so that when the platform is driven downward it will automatically cause such a displacement of the standard or standards.

Signed at Detroit, Michigan, this 25th day of June, 1920.

ALBERT E. COONEY.

Witnesses:
J. R. FURSE,
ALFRED H. KNIGHT.